Dec. 29, 1970   R. L. CLAMPITT   3,551,322
CONVERSION OF OIL SHALE RETORTING GASES
Filed April 3, 1967
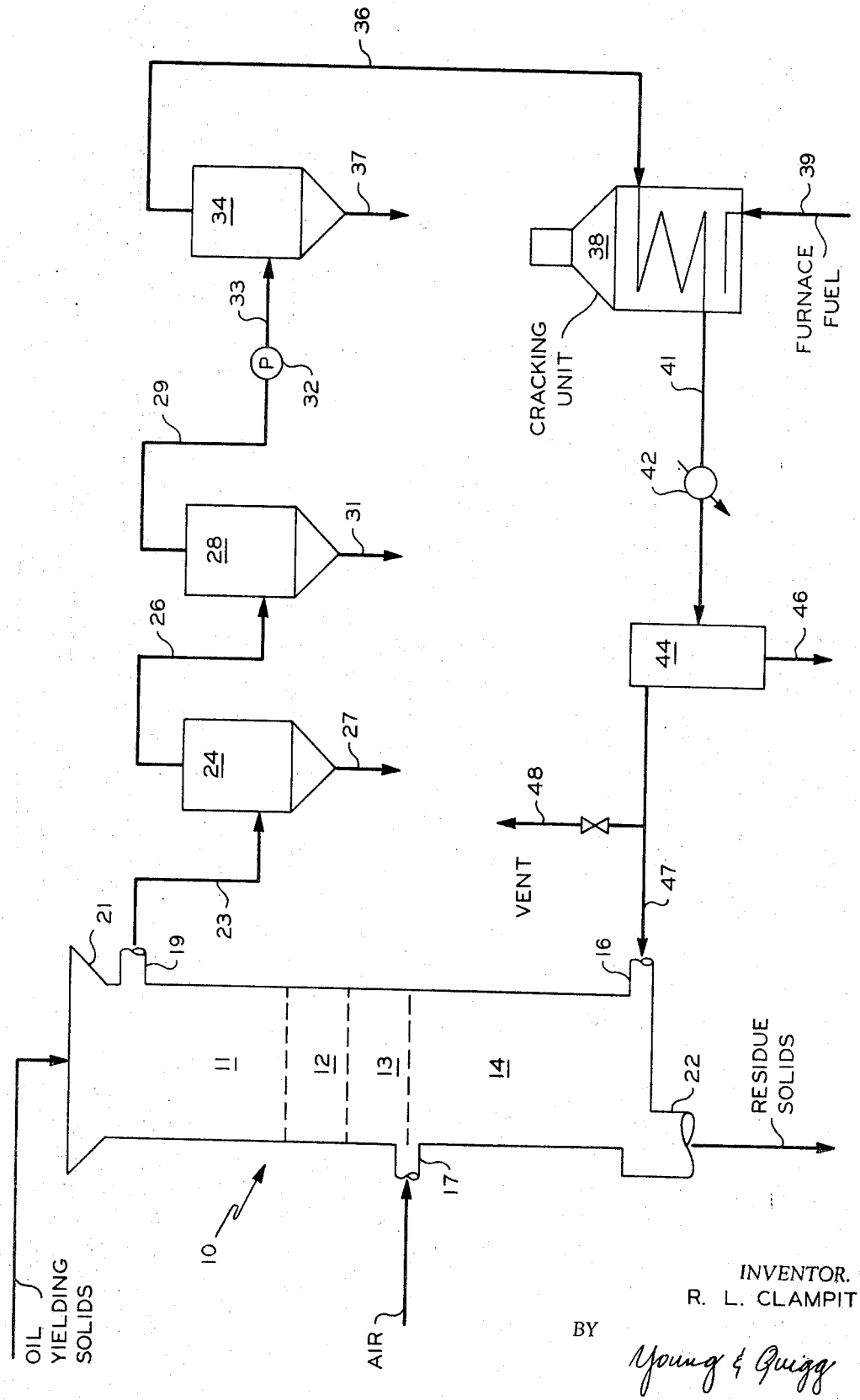
INVENTOR.
R. L. CLAMPITT
BY
*Young & Quigg*
ATTORNEYS

United States Patent Office

3,551,322
Patented Dec. 29, 1970

3,551,322
CONVERSION OF OIL SHALE RETORTING GASES
Richard L. Clampitt, Rifle, Colo., assignor to Phillips Petroleum Company, a corporation of Delaware
Filed Apr. 3, 1967, Ser. No. 627,937
Int. Cl. C10g *11/00;* C10b *53/06*
U.S. Cl. 208—11                                   3 Claims

ABSTRACT OF THE DISCLOSURE

Valuable hydrocarbon products are recovered from the gases present in an oil shale retorting process by cracking the hydrocarbons in the off-gas stream from the liquid recovery step in such a process. The converted hydrocarbons are condensed and recovered from the gas stream after the conversion step; the gas stream can then be recycled to the retorting zone or vented to the atmosphere.

---

This invention relates to recovering hydrocarbons from oil-yielding solids. In one aspect this inevntion relates to the destructive distillation of hydrocarbonaceous solids such as oil shales. In another aspect this invention relates to a method of recovering useful hydrocarbon products from gases produced by the destructive distillation of hydrocarbonaceous solids.

The destructive distillation or retorting method of recovering oil from an oil-yielding solid is relatively simple and straightforward. The essential step of this method is the application of heat in an amount sufficient to educe the oil from oil-yielding solids. One conventional method of supplying heat for retorting is to burn a portion of the hydrocarbon contained on the solids and to use the combustion products and gaseous distillation products as heat transfer media. The heat evolved will serve to educe oil from the oil-yielding material in the form of liquid and/or gaseous hydrocarbon product.

Conventionally, combustion and distillation products are withdrawn from a retorting zone at a relatively low temperature, for example 130–300° F. When product exit stream temperatures are maintained within this range, most of the oil vapors in the stream have reached their dew point and condense as a fine mist before leaving the retort. This mist of fine oil droplets, entrained in the non-condensed gases, is separated in a subsequent liquid recovery step.

Non-condensible gases as used in this application is defined as those gases which fail to condense under the conditions of pressure and temperature at which liquid oil is recovered from the oil mist stream. Non-condensible gases include the hydrocarbon gases produced during the destructive distillation of the hydrocarbonaceous material and flue gases resulting from combustion, such as carbon dioxide, carbon monoxide, and nitrogen. Typically, in the case of oil shale retorting, the non-condensible gas will contain from 6–25 percent combustibles and have a heating value of 40–160 B.t.u./s.c.f., depending upon the richness of the shale and the operating conditions. In the prior art, this gas has been utilized for its heating value or vented to the atmosphere.

According to the invention, in a destructive distillation process for recovering hydrocarbons from oil-yielding solids wherein liquid hydrocarbons and non-condensible gas are recovered, the noncondensible gas is separated from the liquid distillation product and passed to a hydrocarbon conversion zone wherein the hydrocarbon contained in the non-condensible gas is converted, the converted hydrocarbon product is then separated and recovered from the non-condensible gas.

In one embodiment the invention comprises catalytically cracking the non-condensible gas stream over a silica-alumina catalyst at from 950–1150° F., condensing the cracked product, recovering the liquid product from the non-condensible gas stream, and recycling the gas stream to the retorting zone to cool residue solids and act as heat transfer media.

Accordingly, it is an object of this invention to increase the yield of useful hydrocarbon products from a process for the destructive distillation of hydrocarbonaceous solids. Another object of this invention is to recover hydrocarbons from non-condensible gases which result from the destructive distillation of oil-yield solids.

Various other objects and advantages of this invention will be apparent to one skilled in the art upon consideration of the following written description, drawings, and appended claims.

The figure is a schematic representation of a retort and associated equipment utilized in the practice of the invention.

Referring now to the figure, reference numeral 10 denotes generally a vertical retorting vessel having a solid preheating-product cooling zone 11, a distillation zone 12, a combustion zone 13, and a residue cooling-gas heating zone 14. The retorting vessel 10 is provided with a recycle gas inlet 16, an air inlet 17, and a products recovery outlet 19. The retorting vessel 10 has a feed hopper 21 at the top and a residue outlet 22 at the bottom.

Associated with retorting vessel 10 is a product recovery system shown schematically as comprising centrifugal separators 24 and 28, a positive displacement blower 32, and a centrifugal separator 34, and a vapor-liquid separator 44 is provided to process product gases.

The operation of the retorting vessel, product, recovery system, and cracking system illustrated in the figure is described below with reference to the recovery of hydrocarbons from oil shale.

Oil shale, crushed to a suitable particle size, is introduced into the top of retort 10 by means of hopper 21 and is continuously passed downward through retorting vessel 10. The feed shale from hopper 21 can be at ambient temperature. The shale moves downwardly by gravity as a bed of freely moving particles and passes successively through the solids preheating zone 11, the distillation zone 12, a combustion zone 13, and the residue cooling zone 14, and is removed through residue outlet 22.

Relatively cool recycle gas is introduced through inlet 16 and passes upwardly through zone 14, contacting the downwardly moving shale residue, thus cooling the hot residue from the combustion zone 13 and heating the gas. No oxygen is present in zone 14 and no combustion can take place; heat is exchanged counter currently from the downwardly moving combustion zone residue to the rising gas.

An oxygen-containing gas is introduced into retort 10 through inlet 17, thus establishing a combustion zone 13 within the bed of moving particles. The heat developed in the combustion zone results both from the burning of any hydrocarbons remaining in the recycle gas and from burning organics left on the shale particles after they have passed through the distillation zone 12. If desired, a portion of the heated upwardly rising recycle gas can be disengaged from the column of shale particles, passed to a central channel, not shown, and mixed with the oxygen-containing gas to form a combustible mixture.

The hot gases produced in combustion zone 13 pass upwardly and heat the downwardly moving material thereby establishing distillation zone 12 wherein hydrocarbons are educed and distilled from the oil-yield solids. The gases produced by combustion and distillation pass upwardly, contacting and preheating the downwardly moving raw oil-yielding solids. The products of combustion and distillation are withdrawn through recovery outlet 19 at a relatively low temperature, for example 130–300° F. so that substantially all of the oil vapors have reached their dew point and condense as a fine mist before leaving retort 10.

The product mist is conducted through conduit 23 to a first centrifugal separator 24. In separator 24 the larger liquid droplets are removed from the product mist stream and recovered through conduit 27. From separator 24 the product stream is transferred through conduit 26 to a second centrifugal separator 28 where substantially all of the remaining larger liquid droplets are removed from the stream and recovered through conduit 31. The gas stream containing a small amount of fine oil mist withdrawn from separator 28 through conduit 29 and is pressurized by a positive displacement blower 32. A third centrifugal separator 34 connected to the blower discharge line 33 serves to remove a final increment of liquid oil from the gas stream. The oil is recovered through conduit 37.

The gas stream flows through line 36 to a cracking unit 38. The gas stream will ordinarily be relatively lean in combustibles since it is rather highly diluted with combustion products, with carbon dioxide resulting from the decomposition of the mineral carbonates in the shale, and with nitrogen when air is employed to supply combustion within the retort. Typically, in the case of oil shale, this gas stream will contain from 6–25 percent combustibles.

The gas stream is cracked in cracking unit 38 to obtain the desired products. Cracking conditions will depend upon the composition of the feed stream and the products which are desired from the cracking step. A thermal cracking unit being fired with fuel through line 39 has been illustrated but if desired catalytic cracking or other hydrocarbon conversion steps such as hydrocracking can be utilized.

The gas stream containing cracked hydrocarbon products flows from cracking unit 38 through line 41 which contains a refrigerated condenser 42 to cool and condense the cracked hydrocarbon products. The condensed liquid and gas mixture flows to a liquid-vapor separator 44. The liquid product is sepaarted from the non-condensible gas and recovered through conduit 46. If desired, the converted hydrocarbon product can be recovered by other conventional methods such as pressure reduction, lean oil absorption or dessicant scrubbing.

The cool gas flows through line 47 and is recycled through retort 10 and utilized to cool the hot residue in zone 14. A portion of the gas can be vented through conduit 48.

Cracking hydrocarbons contained in the non-condensible gas stream of the retorting process not only increases the yield of valuable hydrocarbons from the process but the removal of hydrocarbons from a recycle gas stream minimizes equipment fouling problems often encountered in gas recycle systems.

The following example will serve to further illustrate this invention.

EXAMPLE

Utilizing the process flow illustrated in the drawing, one ton per hour of oil shale is charged to retort 10. This shale contains 29.4 gallons of oil per ton as determined by Fisher assay or 262 pounds per ton organic carbon. Air is injected through inlet 17 at a rate of 4869 s.c.f./hr. Product mist comprising 21,350 s.c.f./hr. of dry gas, 73 pounds/hr. of water and 214.5 pounds/hr. of oil is recovered at outlet 19. Oil is collected in the mist separation cyclones at a rate of 27.5 gallons per hour. This oil has a density of 7.8 lb./gal. and represents 180.6 pounds of organic carbon.

The dry gas flows through conduit 36 at a rate of 21,350 s.c.f./hr. at a pressure of 90 inches $H_2O$ and a temperature of 185° F. The gas contains 3.2 pounds organic carbon/m.s.c.f., of which 2.1 pounds/m.s.c.f. comprise pentane and heavier hydrocarbons.

Temperatures of about 1550° F. are maintained in cracking furnace 38 which is operated at slightly more that atmospheric pressure. A refrigeration unit maintains a temperature of approximately −40° F. in liquid-vapor separator. Of the 68.1 lbs. of organic carbon/hr. charged to the furnace, about 52 lbs. are recovered from separator 44. This product comprises about 12 lbs. propylene and heavier olefins, and about 40 lbs. $C_5$ hydrocarbons and cokey residue which can be used as carbon black feedstock.

Approximately 15,000 s.c.f./hr. of dry gas from which cracked hydrocarbons have been recovered is recycled to retort 10. The remainder of the gas is vented through line 48 to prevent the buildup of hydrogen, carbon monoride, carbon dioxide, and nitrogen in the retorting system.

Thus, it can be seen that 232.6 pounds of the 262 pounds per hour of organic carbon charged to the retort are recovered as product. Approximately 20 percent of this recovery results from the practice of this invention.

Reasonable modification and variation are within the scope of this invention which provides a novel method of recovering hydrocarbon from oil-yielding solids.

That which is claimed is:

1. In a destructive distillation process for the recovery of hydrocarbons from oil shale wherein hydrocarbons are educed from the oil shale and a hydrocarbon-containing non-condensible gas is evolved in a retort, the improvement comprising:

removing said non-condensible gas from said retort;
separating liquid distillation products from said non-condensible gas;
passing said non-condensible gas from which said liquid distillation products have been removed to a hydrocarbon conversion zone;
converting said non-condensible gas under conversion conditions to obtain hydrocarbon products;
passing the non-condensible gas containing converted hydrocarbon products to a liquid-vapor separation zone;
separating said converted hydrocarbon product from said non-condensible gas in said separation zone;
recovering said hydrocarbon product from said separation zone; and
recycling at least a portion of said non-condensible gas from which converted hydrocarbon product has been recovered to said retort.

2. The method of claim 1 wherein said destructive distillation process for recovering hydrocarbons from oil shale comprises:

passing the oil-yielding solids in particulate form downwardly as a continuous vertical column of solids successively through a distillation zone, a combustion zone, and a residue cooling zone;
withdrawing from about said distillation zone the products of combustion and distillation including normally liquid products together with a hydrocarbon-containing non-condensible gas;
recycling at least a portion of said non-condensible gas from which cracked hydrocarbon product has been recovered to a lower portion of said residue cooling zone;
permitting said recycled gas to pass upwardly through said column in contact with the hot residue from said combustion zone whereby said residue becomes cooled and said gas becomes heated;
disengaging from said column at least a portion of the hot recycled gas flowing upwardly through said residue cooling zone,
passing said disengaged gas through a vertical solids-free channel, said channel being completely surrounded by the vertical column of continuous particulate material and being shielded therefrom at its upper end;

mixing an oxygen containing gas with said disengaged gas and passing the resulting mixture into the column above said residue cooling zone, thereby establishing a zone of combustion in the column of particulate oil shale between said residue cooling zone and said distillation zone; and permitting the hot gases from said combustion zone to pass upwardly through said column thereby effecting distillation of the downwardly moving particulate oil shale.

3. The process of claim 1 wherein hydrocarbons in the non-condensible gas stream are converted by high temperature cracking.

References Cited

UNITED STATES PATENTS

| | | | |
|---|---|---|---|
| 3,409,509 | 11/1968 | Gould | 208—11 |
| 2,285,785 | 6/1942 | Seguy | 208—71 |
| 2,982,701 | 5/1961 | Scott | 208—11 |
| 3,008,894 | 11/1961 | Cubertson | 208—72 |
| 3,107,985 | 10/1963 | Huntington | 208—8 |
| 3,247,092 | 4/1966 | Huntington | 208—8 |
| 3,361,644 | 1/1968 | Deering | 208—8 |

HERBERT LEVINE, Primary Examiner

U.S. Cl. X.R.

208—72